Oct. 15, 1968 R. W. GOODE 3,405,786
FLUID PRESSURE CONTROL FOR BRAKE MECHANISM WITH COOLING MEANS
Filed June 9, 1967 2 Sheets-Sheet 1

BRAKE OIL PRESSURE

INVENTOR.
ROBERT W. GOODE
BY
Allen and Arony
ATTORNEYS

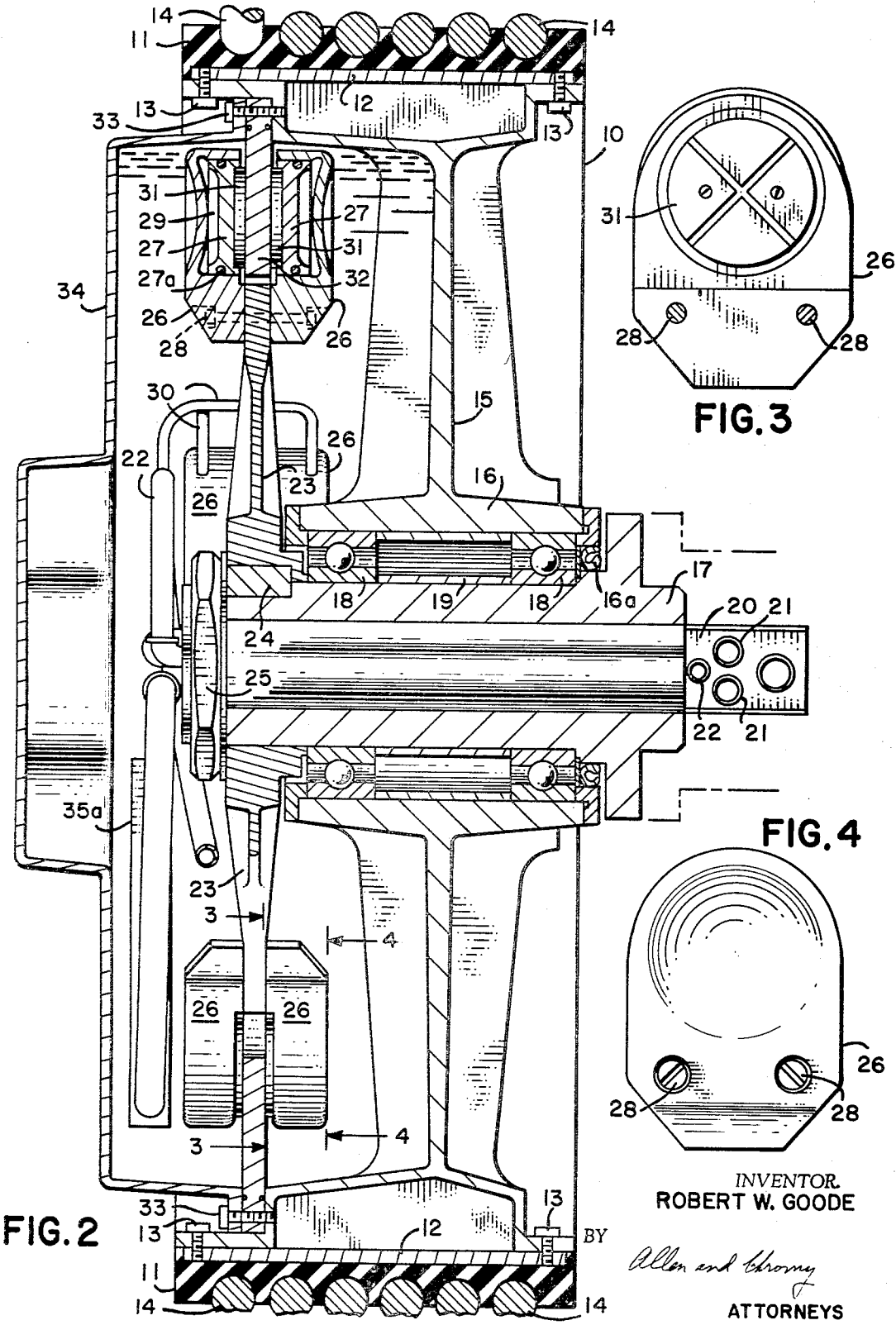

3,405,786
FLUID PRESSURE CONTROL FOR BRAKE
MECHANISM WITH COOLING MEANS
Robert W. Goode, Rte. 1, Box 112A,
Morgan Hill, Calif. 95037
Filed June 9, 1967, Ser. No. 644,916
7 Claims. (Cl. 188—264)

ABSTRACT OF THE DISCLOSURE

A brake mechanism provided with a caliper supporting spider attached to a stationary shaft which also supports the rotatable wheel to which braking is to be applied. The wheel is provided with a grooved disk attached thereto and positioned to be rotatable between the brake caliper supported by the arms of the spider. A housing is provided around the brake mechanism to contain a quantity of oil which receives the heat generated by the braking action by the calipers on the grooved disk. Fluid pressure connections are provided to the calipers for pressing the brake linings thereof against the disk. A heat exchange unit is provided in the housing in contact with the oil contained in the housing to cool this fluid.

Description of the invention

This invention relates to a brake mechanism which is adapted to control the rotation of rotatable members such as bull wheels of cable tensioning apparatus.

An object of this invention is to provide an improved brake mechanism which is adapted to be used with apparatus such as bull wheels of cable tensioning apparatus.

Another object of this invention is to provide an improved braking mechanism which is of efficient and economical construction and which is provided with cooling means for cooling the braking surfaces which are continuously immersed in cooled liquid.

Other and further objects of this invention will be apparent to those skilled in the art to which it relates from the following specification, claims and drawing in which, briefly:

FIG. 2 is a sectional view taken along the line 2—2 of FIG. 1;

FIG. 3 is a sectional view taken along the line 3—3 of FIG. 2;

FIG. 4 is an outside view of one of the caliper halves; and

Figure 1:
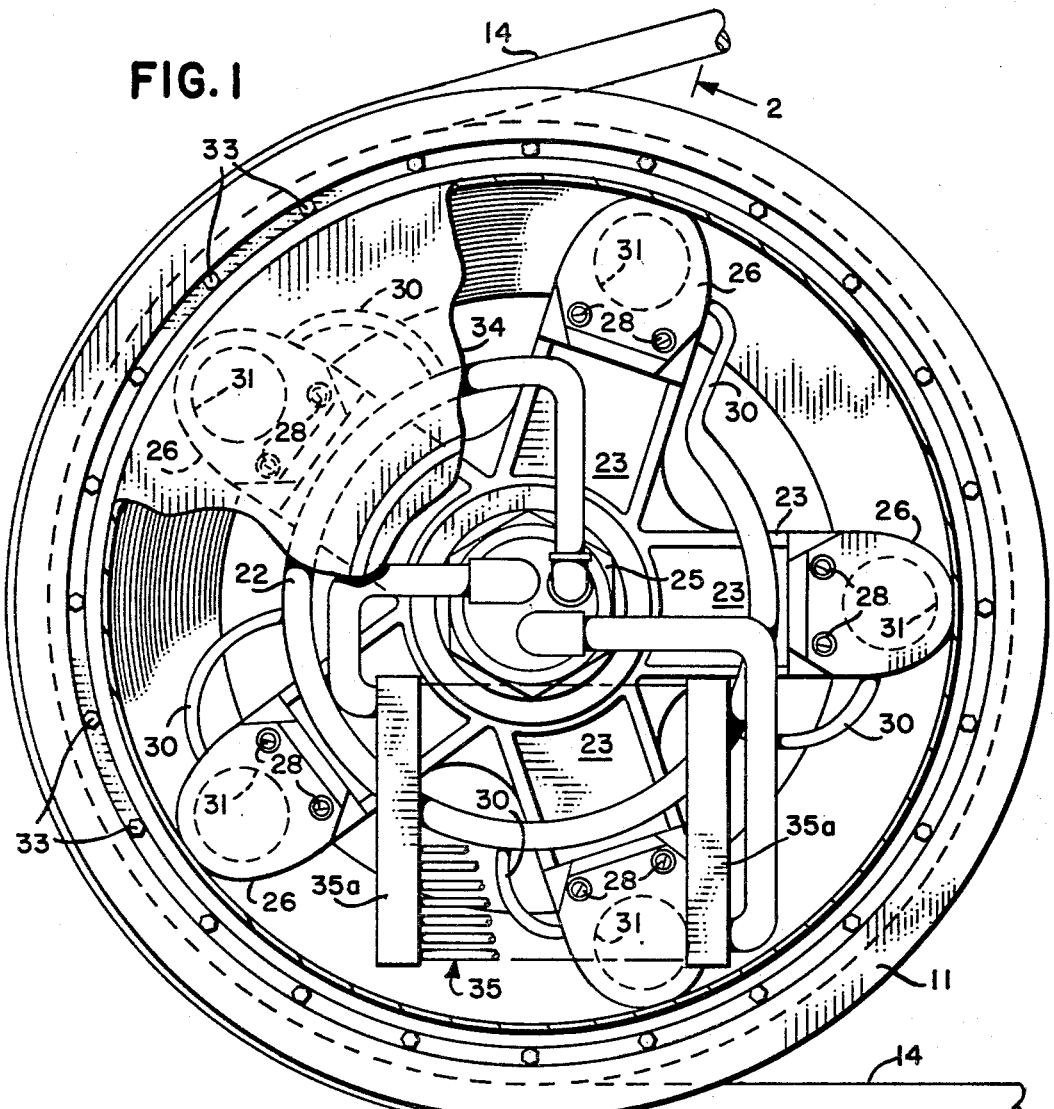
FIG. 1 is a side view of this apparatus with the housing partially broken away to expose the brake mechanism.

Referring to the drawing in detail, reference numeral 10 designates a load bearing wheel such as a bull wheel of a cable tensioner. The outer periphery of the wheel 10 is provided with a plurality of segments 11 made of rubber, neoprene or similar material, each of which is provided with a metal insert 12 vulcanized thereto so that the segments may be attached to the rim of the wheel 10 by bolts 13 which are threaded into the steel inserts.

The liner segments 11 are provided with a plurality of independent grooves which are adapted to receive the cable 14 to be held under tension. The cable may be wound around the outside of the segments 11 of a pair of bull wheels a plurality of turns so as to provide suitable gripping action between the segments and the cable. Generally these bull wheels are employed in pairs in which the wheels are separated a short distance and the cable is looped around both wheels. Suitable spokes and web 15 are provided for attaching the rim of the wheel 10 to the hub 16. Hub 16 is supported on the stationary shaft 17 by suitable ball bearings 18. Two sets of ball bearings 18 are provided and these are spaced by the spacer 19 as shown in FIG. 2 of the drawing. An oil seal 16a is provided at the outer end of the hub 16. Also, the shaft 17 is adapted to be attached to a suitable supporting structure (not shown).

The inside of the stationary shaft 17 is provided with a member 20 through which two cooling fluid pipes 21 and a brake pressure fluid carrying pipe 22 pass, the purpose of which will be described more fully hereinafter.

A brake caliper supporting spider 23, which is provided with five arms, as shown in FIG. 1, is supported on the inner end of the stationary shaft 17 and is keyed thereto by the key 24. A suitable nut 25 is threaded to the inner end of the stationary shaft 17 and holds the brake caliper supporting spider 23 on this shaft. Each of the arms 23 of the spider 23 is provided with a brake caliper which has parts opposed to each other and which are supported on the arm by two bolts 28.

The caliper halves or parts 26 are the same and each is provided with a piston 27 which is positioned in a cylinder formed in the caliper and an O-ring 27a is provided around the periphery of the piston to seal it to the inner surface of the cylinder. A cavity 29 is provided inside of the cylinder between it and the piston 27, and this cavity is connected to the fluid pressure line 30.

The pressure line connections 30 from each of the calipers 26 are all connected to the main pressure line 22 and fluid to this pressure line may be controlled by a suitable valve 22a so that appropriate pressure may be supplied to the pistons 27 of the calipers when it is desired to have these pistons press the brake lining pads 31 thereof against the grooved surface of the brake disk 32, which is attached to the wheel 10 adjacent to the rim portion thereof by the bolts 33.

Figure 5:
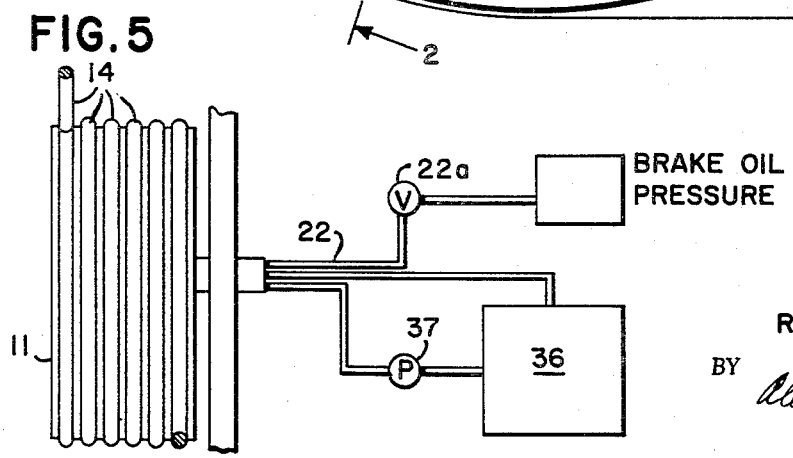
FIG. 5 is a schematic view of this apparatus including the brake fluid pressure supply, refrigeration unit and pump for circulating the refrigerant.

Bolts 33 are also employed for attaching the housing 34 to the wheel. Housing 34 together with the wheel enclose the brake mechanism and also form a container for cooling fluid such as oil, which is adapted to surround the brake disk 32 and calipers 26. Thus, the heat generated by friction on the brake disk 32 by the brake lining pads 31 is transmitted to the fluid in the housing. The fluid in the housing is cooled by a heat exchange device 35. This device is provided with headers 35a at the ends thereof and spaced pipes are connected between these headers. The cooling fluid, which may be water, is passed to one of the headers 35a by one of the pipes 21 and is circulated through the interconnected pipes. The outer surface of these pipes provides a large area exposed to the fluid in the housing 34, and this fluid is cooled by contacting the heat exchanger 35. Any suitable refrigeration or cooling unit 36, shown in diagrammatic form in FIG. 5, may be used for cooling the fluid circulated by a circulating pump 37 through the heat exchanger 35.

What I claim is:

1. In a brake mechanism for controlling the rotation of a rotatable member, the combination of a rotatable member having a braking surface attached thereto and rotatable therewith, a housing adapted to contain a cooling liquid enclosing said braking surface for the cooling thereof, a shaft supporting said rotatable member and having a part thereof extending into said housing, braking means having means applying pressure to said braking surface, said braking means comprising a member supported by said shaft in said housing, means cooling said cooling liquid in which the braking surface and braking means are immersed, said cooling means comprising a heat exchange member located in said housing having a cooling surface thereof contacting said cooling liquid, means circulating a cooled fluid through said heat exchange member and means cooling said cooled fluid.

2. In a brake mechanism for controlling the rotation of a rotatable member, the combination as set forth in claim 1 further characterized in that the braking surface attached to said rotatable member comprises a flat ring attached adjacent the periphery of said rotatable member.

3. In a brake mechanism for controlling the rotation of a rotatable member, the combination as set forth in claim 2 further characterized in that said housing is attached to said rotatable member adjacent the periphery of said ring.

4. In a brake mechanism for controlling the rotation of a rotatable member, the combination as set forth in claim 3 further characterized in that said shaft is stationary, said means circulating cooled fluid to said heat exchange member comprising pipes passing through said stationary shaft.

5. In a brake mechanism for controlling the rotation of a rotatable member, the combination as set forth in claim 1 further characterized in that said braking means comprises a plurality of calipers, each caliper having pistons and brake linings adapted to engage said braking surface, and means supplying fluid pressure to said piston to press the brake lining thereof against said braking surface.

6. In a brake mechanism for controlling the rotation of a rotatable member, the combination as set forth in claim 5 further characterized in that said shaft is stationary and said means supplying fluid pressure comprises a pressure fluid line passing through said stationary shaft.

7. In a brake mechanism for controlling the rotation of a rotatable member, the combination as set forth in claim 6 further characterized in that said member supporting said braking means comprises a member having a plurality of radially extending arms, said arms each supporting a caliper with opposing parts, one of said parts being on one side of said braking surface and the other of said parts being on the other side of said braking surface.

References Cited

UNITED STATES PATENTS

| 2,148,818 | 2/1939 | Kattwinkel | 188—264 X |
| 2,672,954 | 3/1954 | Bennett. | |
| 2,672,956 | 3/1954 | Webb et al. | 188—73 X |
| 2,682,320 | 6/1954 | Chamberlain et al. | 188—264 |
| 3,366,210 | 1/1968 | Webster | 188—264 X |

MILTON BUCHLER, *Primary Examiner.*

GEORGE E. A. HALVOSA, *Assistant Examiner.*